United States Patent
He et al.

(10) Patent No.: US 11,897,030 B2
(45) Date of Patent: Feb. 13, 2024

(54) METHOD AND SYSTEM FOR IMPROVED TEMPERATURE CONTROL FOR ADDITIVE MANUFACTURING

(71) Applicant: Air Products and Chemicals, Inc., Allentown, PA (US)

(72) Inventors: Liang He, Allentown, PA (US); Ranajit Ghosh, Macungie, PA (US); Mark Kurt Weise, Harrisburg, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 17/341,488

(22) Filed: Jun. 8, 2021

(65) Prior Publication Data

US 2022/0008995 A1    Jan. 13, 2022

Related U.S. Application Data

(60) Provisional application No. 63/049,404, filed on Jul. 8, 2020.

(51) Int. Cl.
| | |
|---|---|
| *B22F 10/34* | (2021.01) |
| *B33Y 10/00* | (2015.01) |
| *B33Y 30/00* | (2015.01) |
| *B33Y 50/02* | (2015.01) |
| *B22F 10/20* | (2021.01) |
| *B22F 10/85* | (2021.01) |
| *B22F 12/20* | (2021.01) |
| *B22F 12/41* | (2021.01) |
| *B22F 12/90* | (2021.01) |

(52) U.S. Cl.
CPC .............. *B22F 10/34* (2021.01); *B22F 10/20* (2021.01); *B22F 10/85* (2021.01); *B22F 12/20* (2021.01); *B22F 12/41* (2021.01); *B22F 12/90* (2021.01); *B33Y 10/00* (2014.12); *B33Y 30/00* (2014.12); *B33Y 50/02* (2014.12); *B22F 2203/11* (2013.01)

(58) Field of Classification Search
CPC .......... B22F 10/34; B22F 10/20; B22F 12/20; B22F 12/41; B22F 12/90; B33Y 10/00; B33Y 50/02
See application file for complete search history.

(56) References Cited

U.S. PATENT DOCUMENTS

| | | | |
|---|---|---|---|
| 10,486,271 B2 | 11/2019 | Veldsman et al. | |
| 2006/0228465 A1* | 10/2006 | Zurecki | C21D 1/667 427/446 |
| 2019/0061061 A1 | 2/2019 | Fischer et al. | |
| 2019/0184494 A1 | 6/2019 | Bennett et al. | |

\* cited by examiner

*Primary Examiner* — Brian D Walck
*Assistant Examiner* — Nazmun Nahar Shams
(74) *Attorney, Agent, or Firm* — Amy Carr-Trexler

(57) ABSTRACT

A method and system for providing cooling to a part formed using high-temperature additive manufacturing process. Infrared sensors or cameras are used to measure sidewall temperatures and, optionally, top layer temperature. Coolant nozzles provide cooling to the sidewalls of the finished layers and, optionally, to the top layer. The coolant intensity of the coolant nozzles is controlled in order to reduce temperature gradients between layers and/or to maintain temperatures in each layer below preferred maximum temperature.

12 Claims, 16 Drawing Sheets

METHOD AND SYSTEM FOR IMPROVED TEMPERATURE CONTROL FOR ADDITIVE MANUFACTURING

CROSS-REFERENCE TO RELATED APPLICATIONS

This application claims the priority of U.S. Provisional Application No. 63/049,404 filed on Jul. 8, 2020, which is incorporated by reference herein in its entirety.

BACKGROUND

Additive manufacturing, also referred to as 3D printing, is a technique for rapid manufacturing and prototyping of parts. In general, additive manufacturing entails the layer-by-layer deposition of material by computer control to form a three-dimensional object. Most early additive manufacturing techniques utilized polymeric or plastic materials as raw materials, as such materials are easily handled and melt at low temperatures. Additive manufacturing of metal parts, particularly for complex structures has become more widely used.

Directed energy deposition ("DED") is one form of additive manufacturing of metals. Examples of DED additive manufacturing processes include wire-arc additive manufacturing ("WAAM") and blown powder additive manufacturing processes. An exemplary prior art WAAM process is shown in FIGS. 1 and 2. A part 112 is formed by laying down multiple layers 122, 124a-e of metal on a substrate 114, which is supported by a table 116. The layers 122, 124a-e are formed by feeding a feed wire 220 to an arc torch 118 and moving both the feed wire 220 and the arc torch 118 in a direction D, which melts the wire and forms a top layer 122. Each layer cools as it is formed, resulting in the top layer 122 having the highest temperature and the lowermost finished layer 124a having the lowest temperature.

As shown in FIG. 2, a shielding device 128 may optionally trail the feed wire 120. The shielding device 128 provides a blanket of an inerting gas (e.g., argon, nitrogen, or helium), which reduces oxidation of the top layer 122 as it cools. Alternatively, the WAAM process could be carried out in an inert environment, which would eliminate the need for the shielding device 128.

Additive manufacturing of metallic materials introduces challenges due, in part, to the higher temperatures required to melt and form each layer. The failure to effectively remove and control heat during the formation of a metal part can result in undesirable effects in the finished part. Excessive temperature build up in layers can adversely affect microstructure and dimensional control. Excessive temperatures in any layer can also lead to increased oxidation. A large temperature gradient between layers of the part during manufacturing can lead to the formation of harmful thermal-induced residual stress and micro-cracks, which affect the final mechanical properties and service life of the part. The allowable maximum temperature gradient is different for different material in different temperature range.

Examples of efforts to dissipate heat from the part 112 include chilling the substrate 114 or the table 116, immersing the substrate 114 and the finished layers 124a-e in a cooling medium, cooling of each top layer 122 as it is finished (using cold rolling or a cryogenic fluid), and a carbon dioxide cooling spray that trails the welding zone (e.g., U.S. Pat. No. 10,486,271). Unfortunately, many of these heat dissipation techniques did not adequately dissipate heat and none adequately address the problem of temperature gradients between finished layers 124a-e and between the finished layers 124a-e and the top layer 122.

Therefore, there is a need for an improved method and system for dissipating heat from a high-temperature additive manufacturing process for metal parts that avoids temperatures in the additive layers and maintains temperature gradients to a level sufficiently low to avoid undesirable characteristics in the finished part.

SUMMARY

Several specific aspects of the systems and methods of the subject matter disclosed herein are outlined below.

Aspect 1: A method comprising:
a. forming a metal part comprising a plurality of layers using a direct energy deposition additive manufacturing process, the plurality of layers comprising a top layer and a plurality of finished layers that collectively form left and right sidewalls;
b. providing a plurality of coolant nozzles in fluid flow communication with a cryogenic fluid, the plurality of coolant nozzles comprising a plurality of sidewall coolant nozzles that are capable of provide cooling to at least a portion of at least one of the left and right sidewalls;
c. measuring a plurality of sidewall temperatures, each of the plurality of sidewall temperatures corresponding to a different one of the plurality of layers; and
d. controlling a cooling intensity of each of the plurality of coolant nozzles in order to maintain a temperature gradient between each of the side wall temperatures measured in step (c) below a first predetermined maximum temperature gradient and below a first predetermined maximum temperature.

Aspect 2: The method of aspect 1, wherein step (a) further comprises forming the metal part comprising the plurality of layers using a wire-arc additive manufacturing process.

Aspect 3: The method of aspect 1, wherein step (a) further comprises forming the metal part comprising the plurality of layers using a blown powder additive manufacturing process.

Aspect 4: The method of any of aspects 1 through 3, wherein each of the plurality of layers has a height of at least 1 mm.

Aspect 5: The method of any of aspects 1 through 4, wherein the plurality of coolant nozzles comprises at least one top nozzle that is adapted to provide cooling to the top layer and a plurality of sidewall nozzles that are adapted to cool at least one of the plurality of finished layers.

Aspect 6: The method of aspect 6, wherein the cryogenic fluid in fluid flow communication with the plurality of sidewall nozzles has a different composition from the cryogenic fluid in fluid flow communication with the at least one top nozzle.

Aspect 7: The method of any of aspects 1 through 6, wherein the plurality of sidewall temperatures measured in step (c) are measured using a plurality of infrared sensors.

Aspect 8: The method of any of aspects 1 through 6, wherein the plurality of sidewall temperatures measured in step (c) are measured using at least one infrared camera.

Aspect 9: The method of aspect 8, wherein the plurality of sidewall temperatures are obtained by reading a plurality of temperatures at different layers from a temperature field captured by each of the at least one sidewall infrared camera.

Aspect 10: The method of any of aspects 1 through 9, further comprising:
- g. measuring a plurality of top layer temperatures; and
- h. controlling a cooling intensity of each of the plurality of coolant nozzles in order to maintain a temperature gradient between each of the top layer temperatures measured in step (g) below a second predetermined maximum temperature gradient and a second predetermined maximum temperature.

Aspect 11: A system for producing a metal part having left and right sidewalls, the system comprising:
- a direct energy deposition assembly comprising a torch and a metal feed;
- a plurality of cooling nozzles in fluid flow communication with a cryogenic fluid and adapted to move with the direct energy deposition assembly, the plurality of cooling nozzles including a plurality of sidewall nozzles adapted to provide cooling to at least a portion of at least one of the left and right sidewalls;
- a plurality of temperature sensors comprising at least one sidewall temperature sensor, each of the at least one sidewall temperature sensors being adapted to detect a temperature of at least a portion of one of the left and right sidewalls;
- a controller that is electrically connected to the torch, the metal feed, the plurality of temperature sensors, and the plurality of cooling nozzles;
- wherein the controller is adapted to adjust the cooling intensity of each of the plurality of sidewall nozzles based on data received from the plurality of temperature sensors in order to maintain a temperature gradient in each of the left and right sidewalls below a first predetermined maximum temperature gradient and below a first predetermined maximum temperature.

Aspect 12: The system of aspect 11, wherein the metal feed comprises a wire feed or a blown powder feed.

Aspect 13: The system of aspect 11, wherein the plurality of cooling nozzles further comprises at least one top nozzle positioned to trail the metal feed when as the metal part is being formed and is adapted to provide cooling to at least a portion of at least one of a top layer of the metal part.

Aspect 14: The system of aspect 13, wherein at least one top nozzle is in fluid flow communication with a cryogenic fluid having a different chemical composition than the cryogenic fluid in fluid flow communication with the plurality of sidewall nozzles.

Aspect 15: The system of aspect 11, wherein the at least one sidewall temperature sensor comprises an infrared camera.

Aspect 16: The system of aspect 11, wherein the direct energy deposition assembly is adapted to form the part by depositing a plurality of layers at least 1 mm in height.

BRIEF DESCRIPTION OF THE DRAWING(S)

Figure 3:
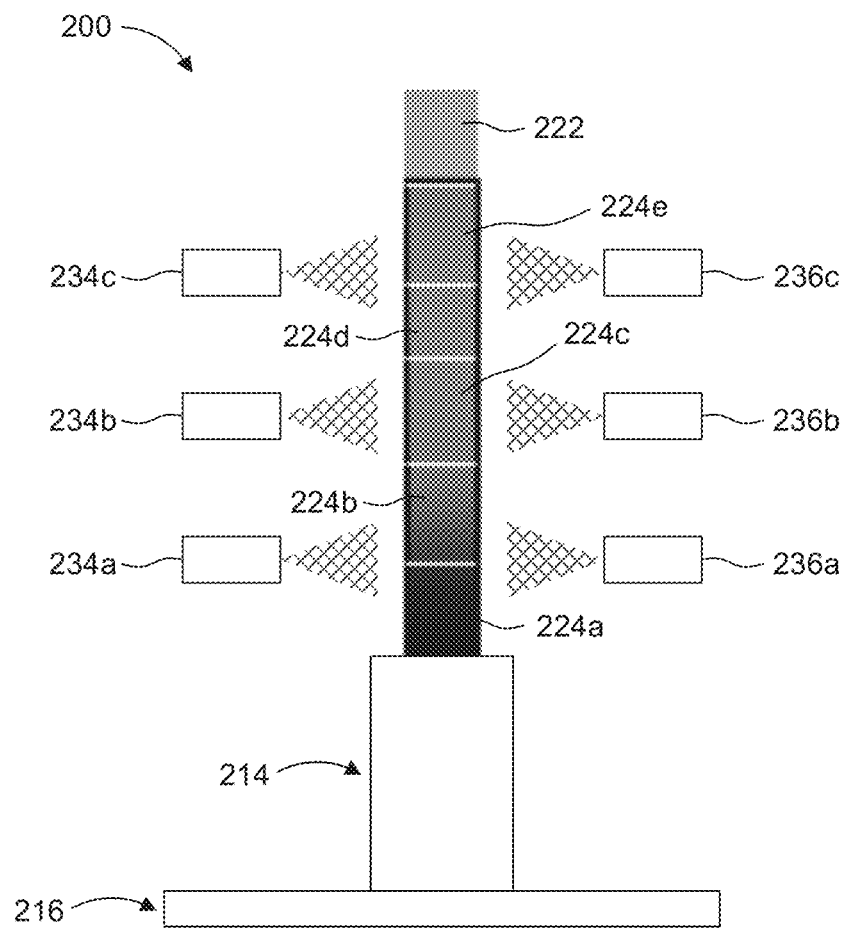
FIG. 3 is an end elevation view of a first exemplary embodiment of the invention showing multiple side wall cooling nozzles directed to each side wall.
Figure 8:
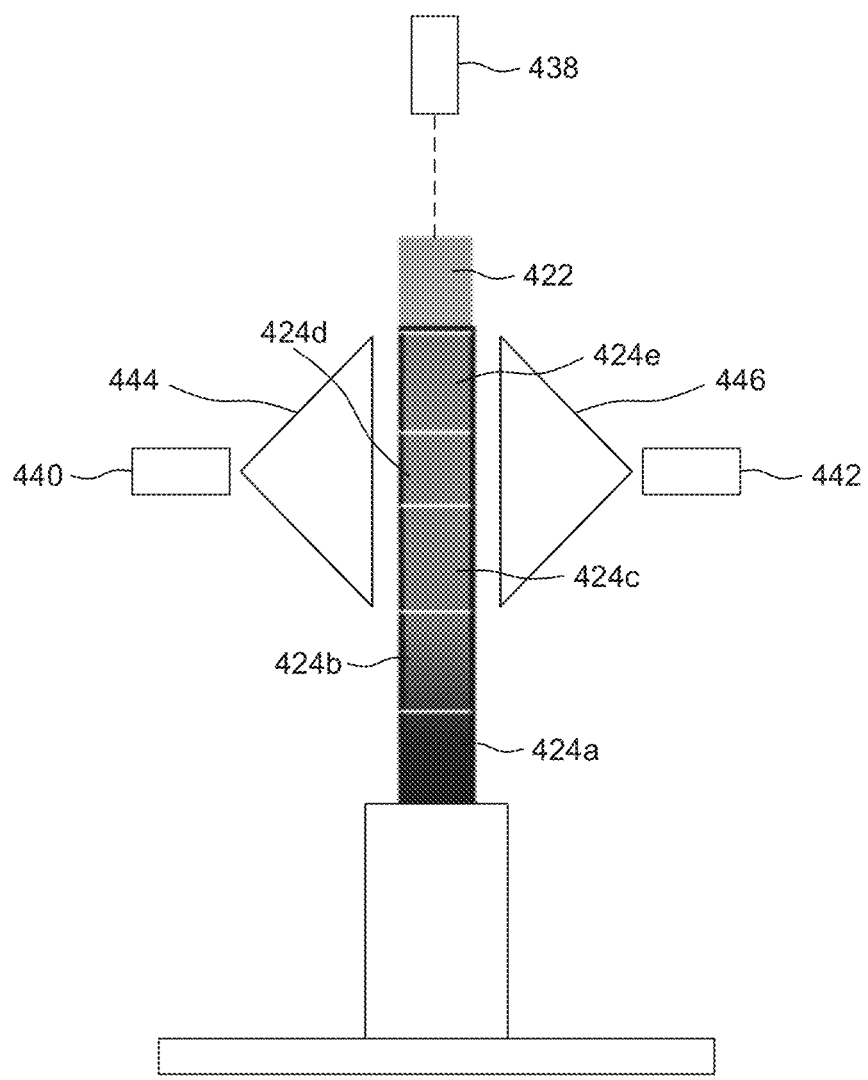
Figure 9:
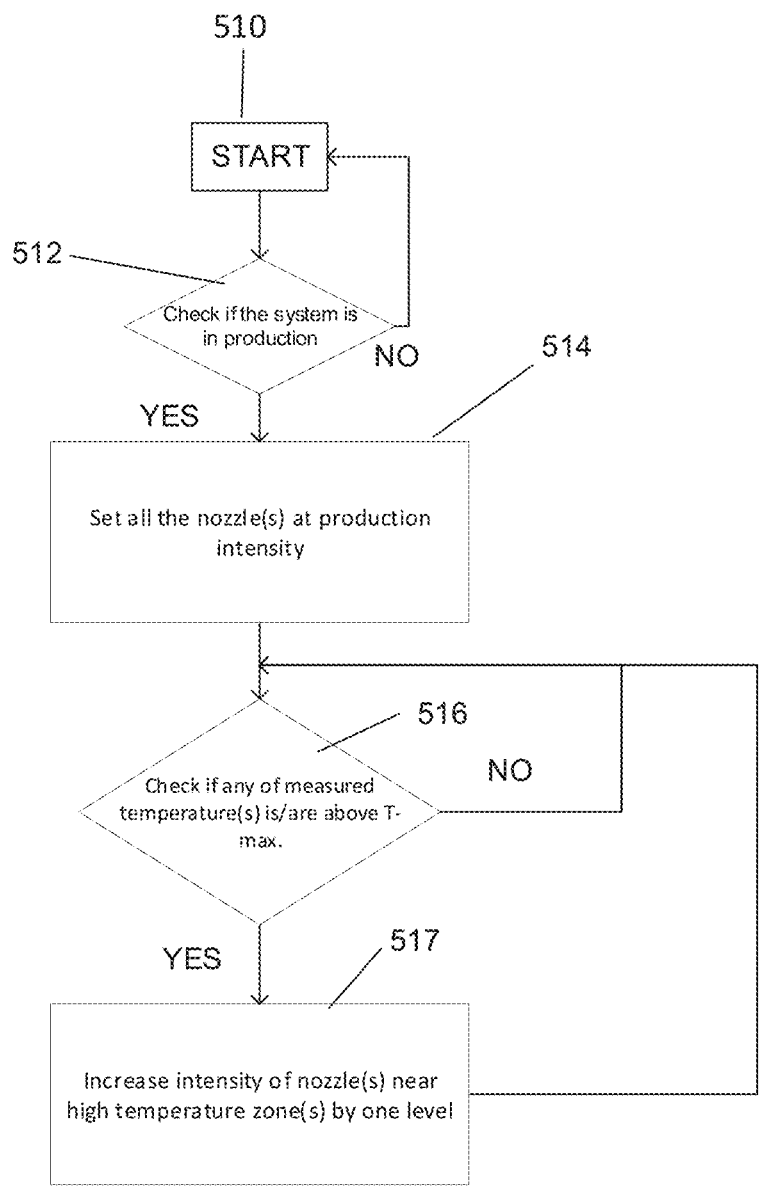
Figure 10:
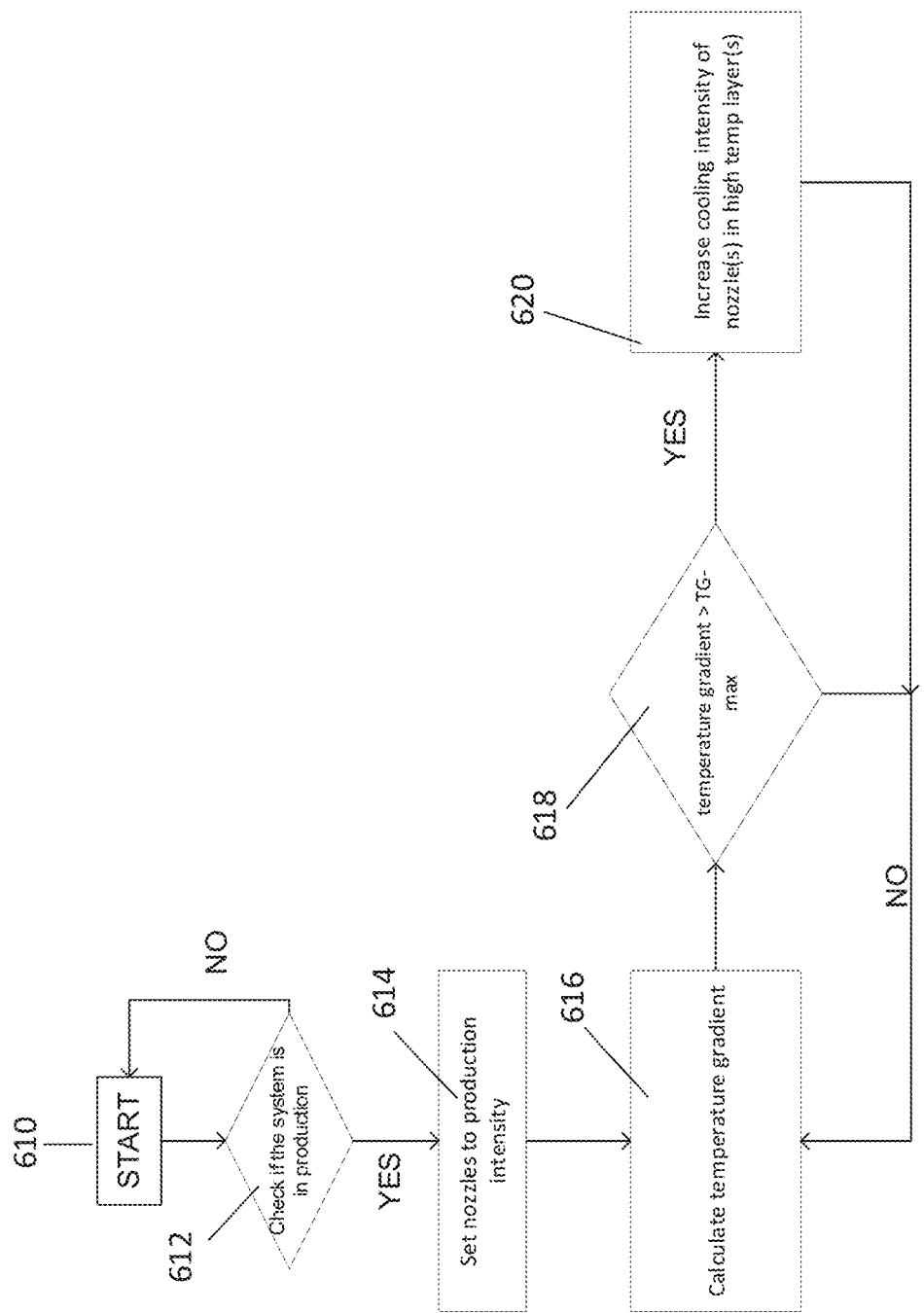
Figure 11:
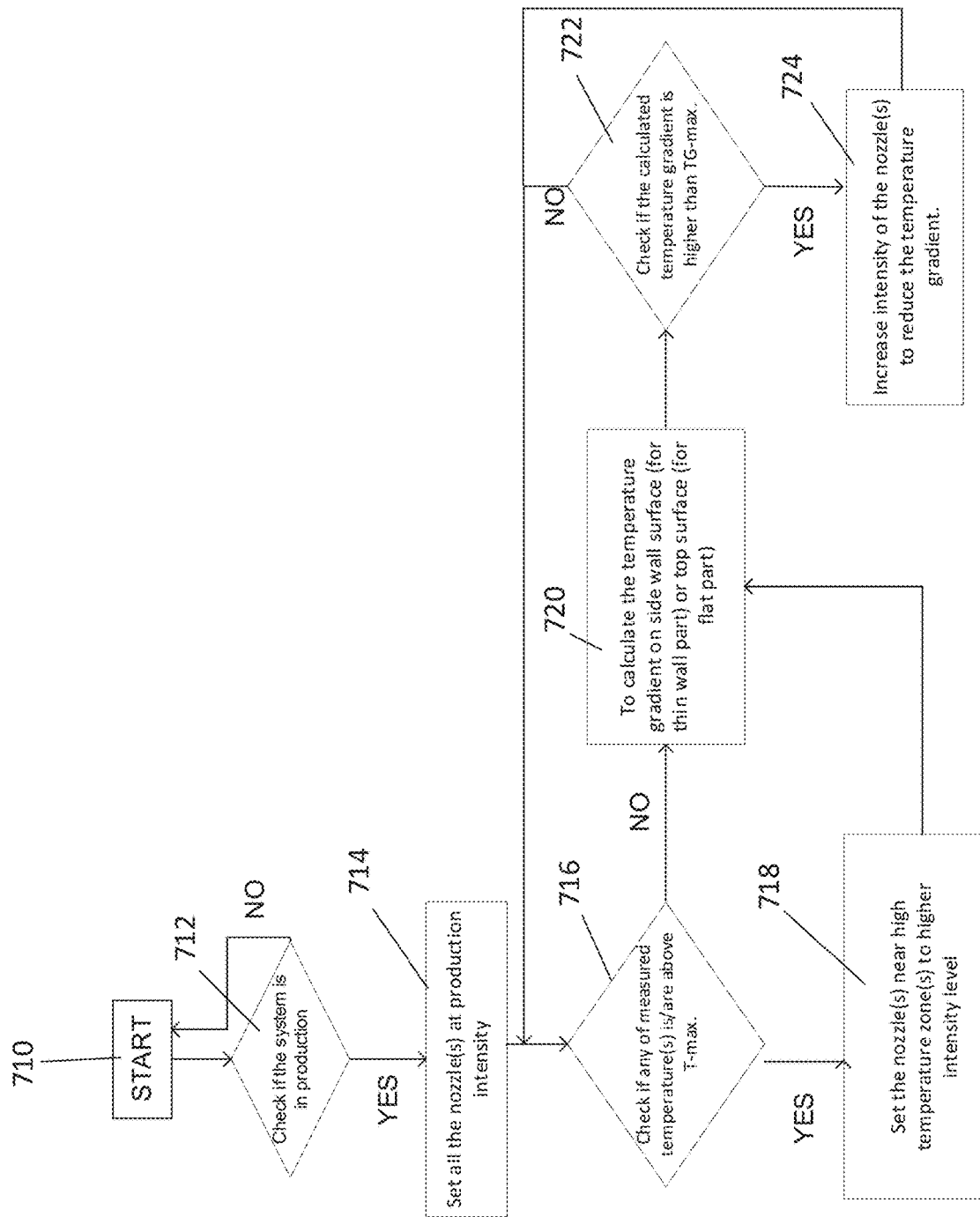
Figure 12:
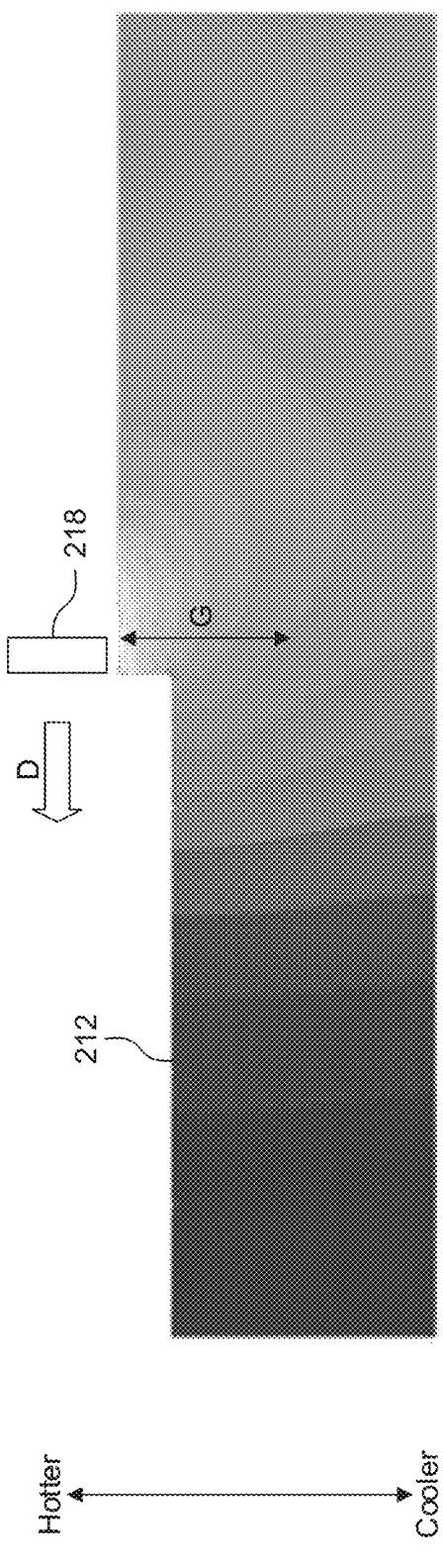
Figure 13:
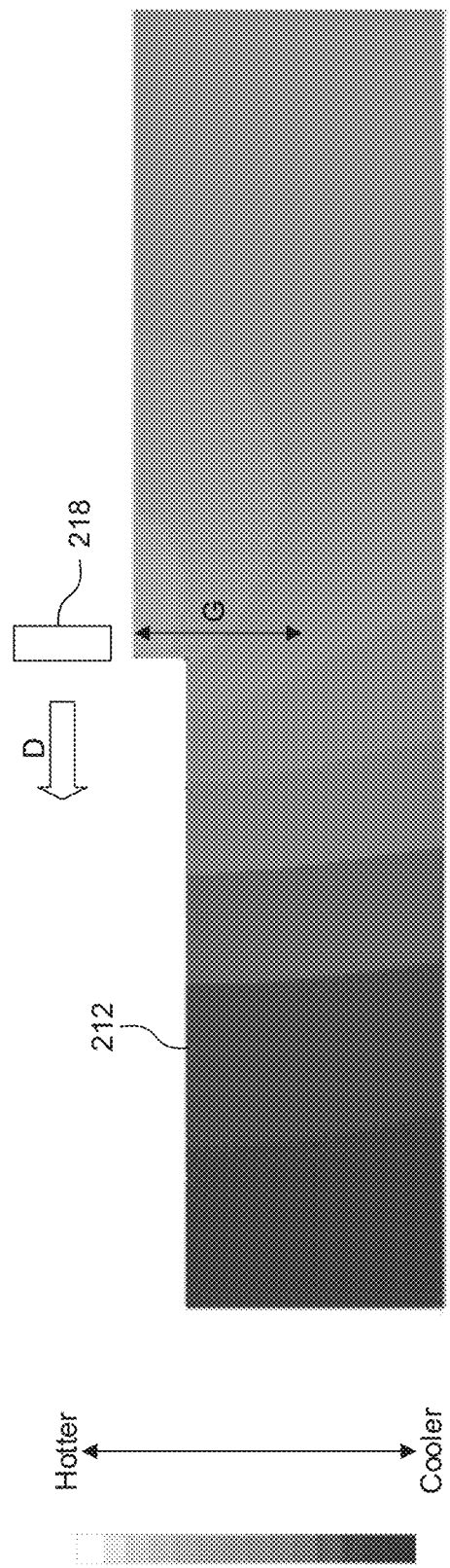
Figure 14:
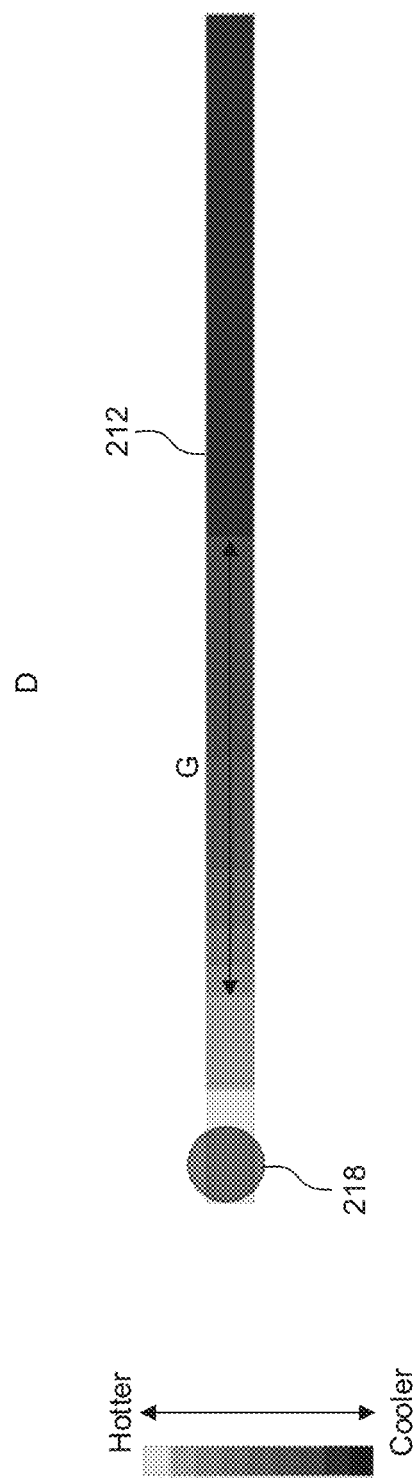
Figure 15:
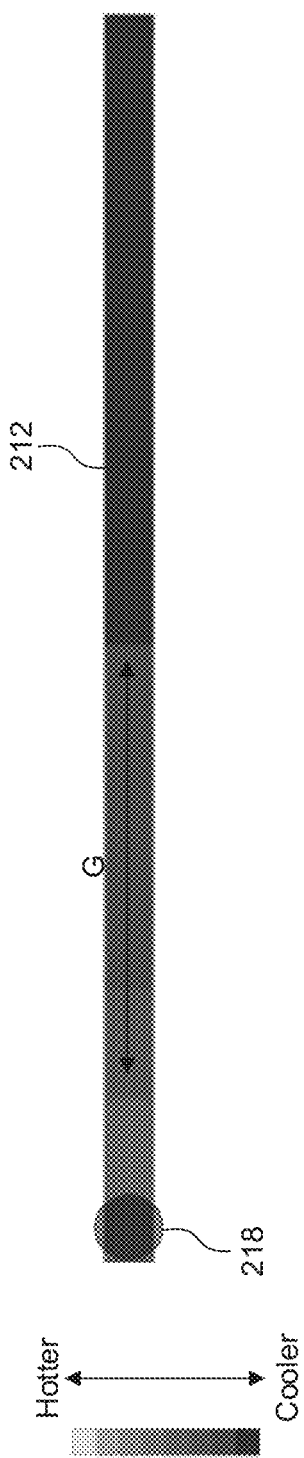
Figure 16:
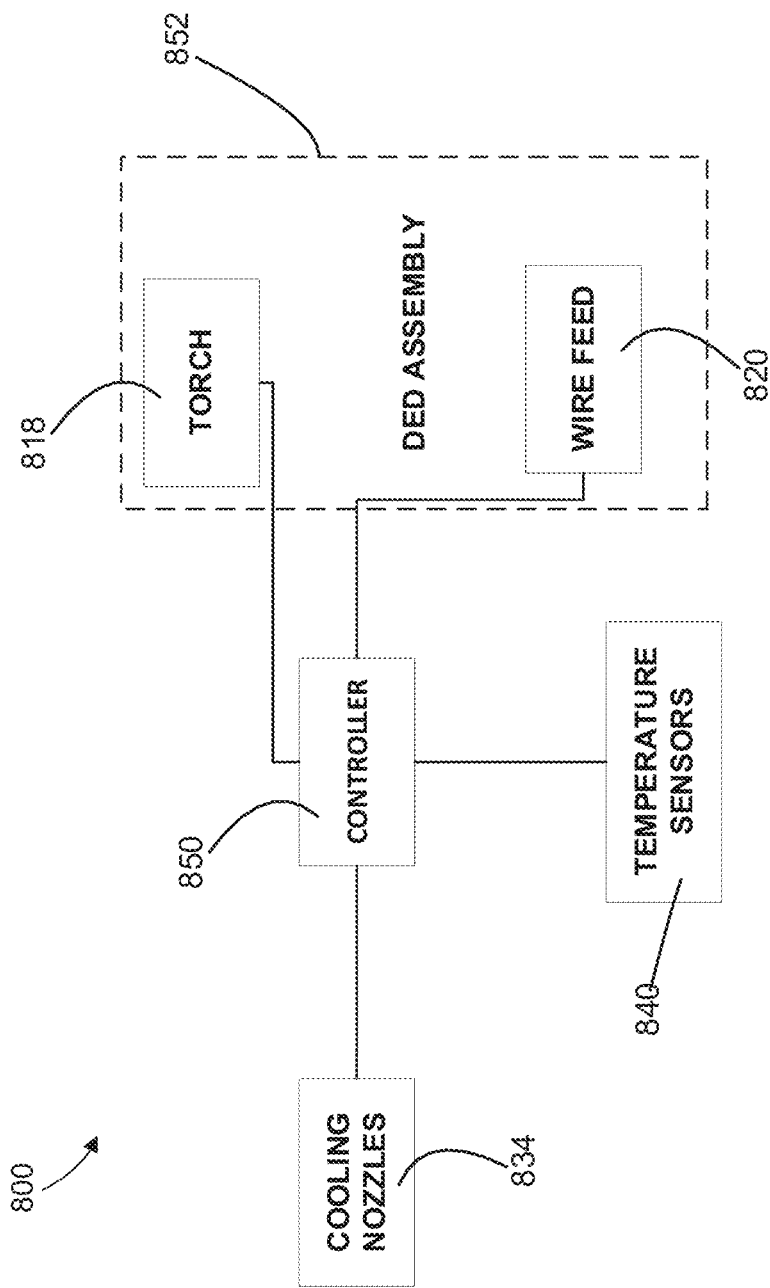

FIG. 8. is an end elevation view of the embodiment of FIG. 3, showing temperature sensors;

FIG. 9 is a flow diagram showing a first embodiment of exemplary control logic for the cooling system;

FIG. 10 is a flow diagram showing a second embodiment of exemplary control logic for the cooling system;

FIG. 11 is a flow diagram showing a third embodiment of exemplary control logic for the cooling system;

FIG. 12 is a simulated temperature field of a sidewall of a part formed using WAAM without cooling;

FIG. 13 is a simulated temperature field of a sidewall of a part formed using WAAM with cooling;

FIG. 14 is a simulated temperature field of a top surface of a top layer of a part formed using WAAM without cooling;

FIG. 15 is a simulated temperature field of a top surface of a top layer of a part formed using WAAM with cooling; and FIG. 16 is a schematic view of an exemplary system including a controller.

DETAILED DESCRIPTION OF THE PREFERRED EMBODIMENT(S)

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention.

In order to aid in describing the invention, directional terms may be used in the specification and claims to describe portions of the present invention (e.g., upper, lower, left, right, etc.). These directional terms are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

In the claims, letters are used to identify claimed steps (e.g. (a), (b), and (c)). These letters are used to aid in referring to the method steps and are not intended to indicate the order in which claimed steps are performed, unless and only to the extent that such order is specifically recited in the claims.

Directional terms may be used in the specification and claims to describe portions of the present invention (e.g., upper, lower, left, right, etc.). These directional terms are merely intended to assist in describing exemplary embodiments and are not intended to limit the scope of the claimed invention. As used herein, the term "upstream" is intended to mean in a direction that is opposite the direction of flow of a fluid in a conduit from a point of reference. Similarly, the term "downstream" is intended to mean in a direction that is the same as the direction of flow of a fluid in a conduit from a point of reference.

The term "fluid flow communication," as used in the specification and claims, refers to the nature of connectivity between two or more components that enables liquids, vapors, and/or two-phase mixtures to be transported between the components in a controlled fashion (i.e., without leakage) either directly or indirectly. Coupling two or more components such that they are in fluid flow communication with each other can involve any suitable method known in the art, such as with the use of welds, flanged conduits, gaskets, and bolts. Two or more components may also be coupled together via other components of the system that may separate them, for example, valves, gates, or other devices that may selectively restrict or direct fluid flow.

The term "conduit," as used in the specification and claims, refers to one or more structures through which fluids can be transported between two or more components of a system. For example, conduits can include pipes, ducts, passageways, and combinations thereof that transport liquids, vapors, and/or gases.

As used herein, the term "cryogen" or "cryogenic fluid" is intended to mean a liquid, gas, or mixed phase fluid having a temperature less than −70 degrees Celsius. Examples of cryogens include liquid nitrogen (LIN), liquefied natural gas (LNG), liquid helium, liquid carbon dioxide and pressurized, mixed phase cryogens (e.g., a mixture of LIN and gaseous nitrogen). As used herein, the term "cryogenic temperature" is intended to mean a temperature below −70 degrees Celsius.

Figure 1:
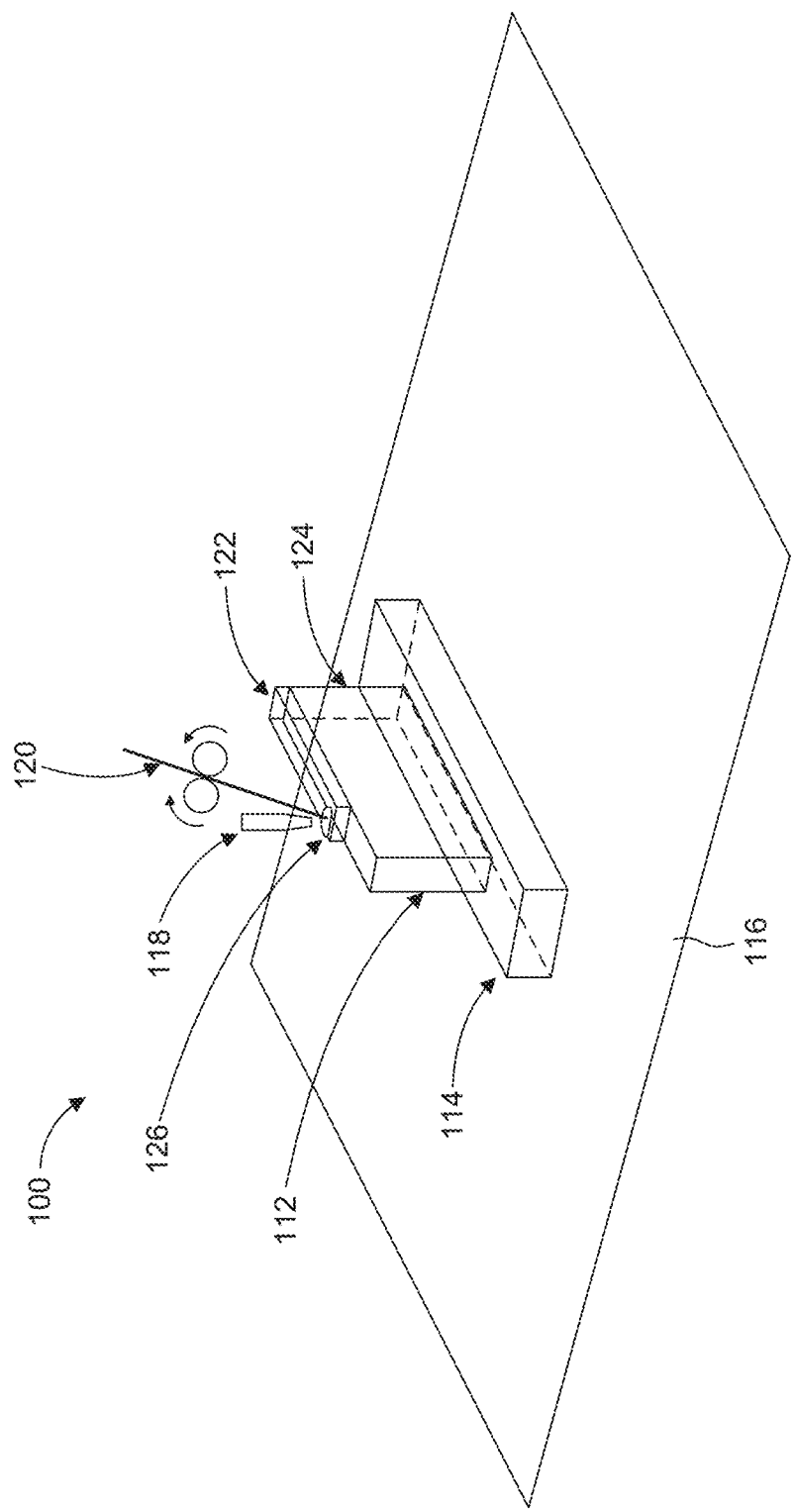
FIG. 1 is a schematic perspective view of a first exemplary embodiment of a prior art WAAM.
Figure 2:
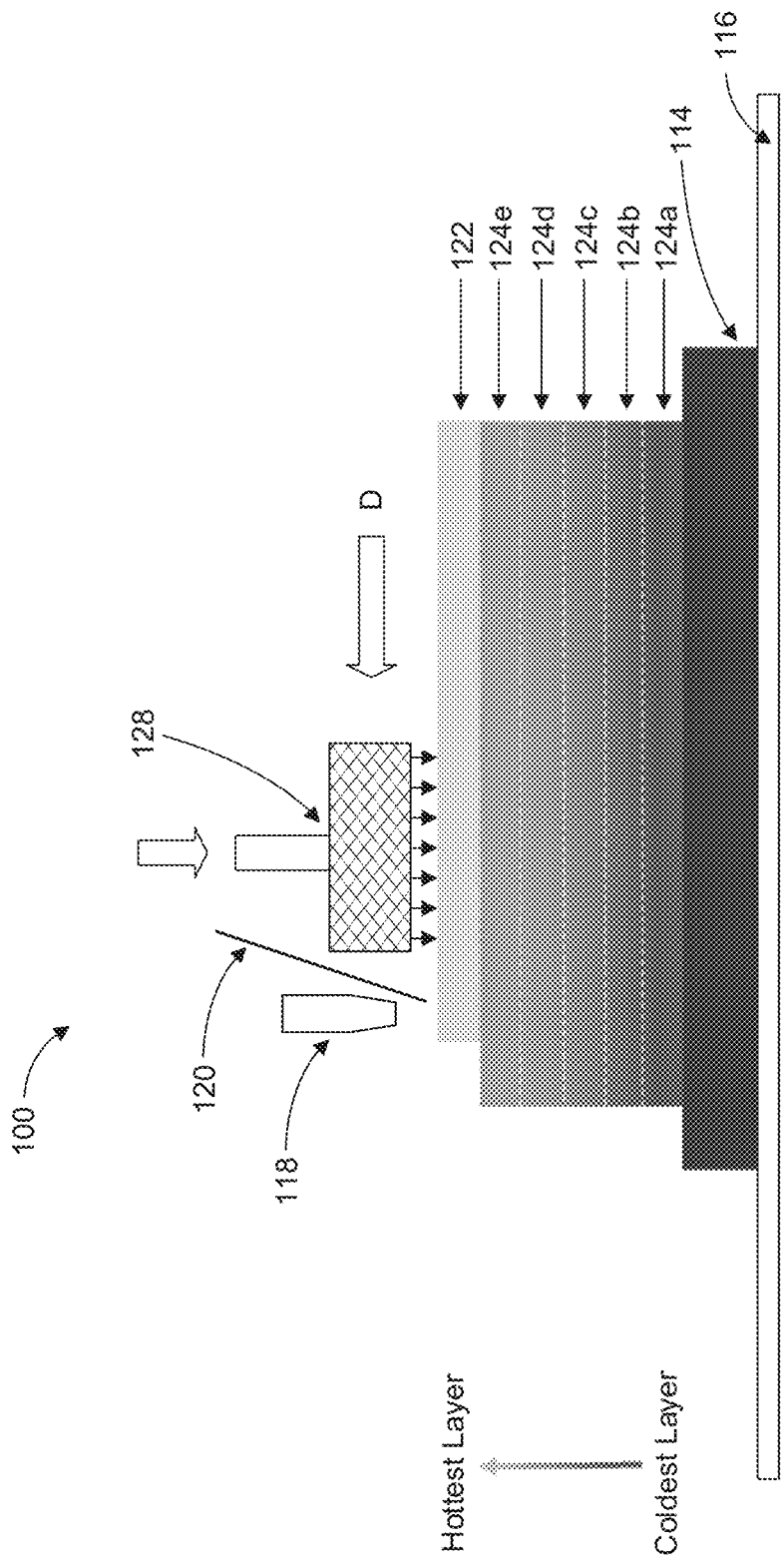
FIG. 2 is a schematic side elevation view of the embodiment of FIG. 1.

In each of the subsequent embodiments disclosed herein, elements shared with the first embodiment (system 100) are represented by reference numerals increased by factors of 100. For example, the top layer 122 of FIGS. 1 & 2 corresponds to the top layer 222 FIGS. 3 & 4. In the interest of balancing clarity and brevity, some elements of a subsequent embodiment that are shared with a previous embodiment are numbered in the figures but are not separately called out in the specification. Unless otherwise stated, it can be assumed that such elements are identical in structure and function to the embodiment in which they are described.

Figure 4:
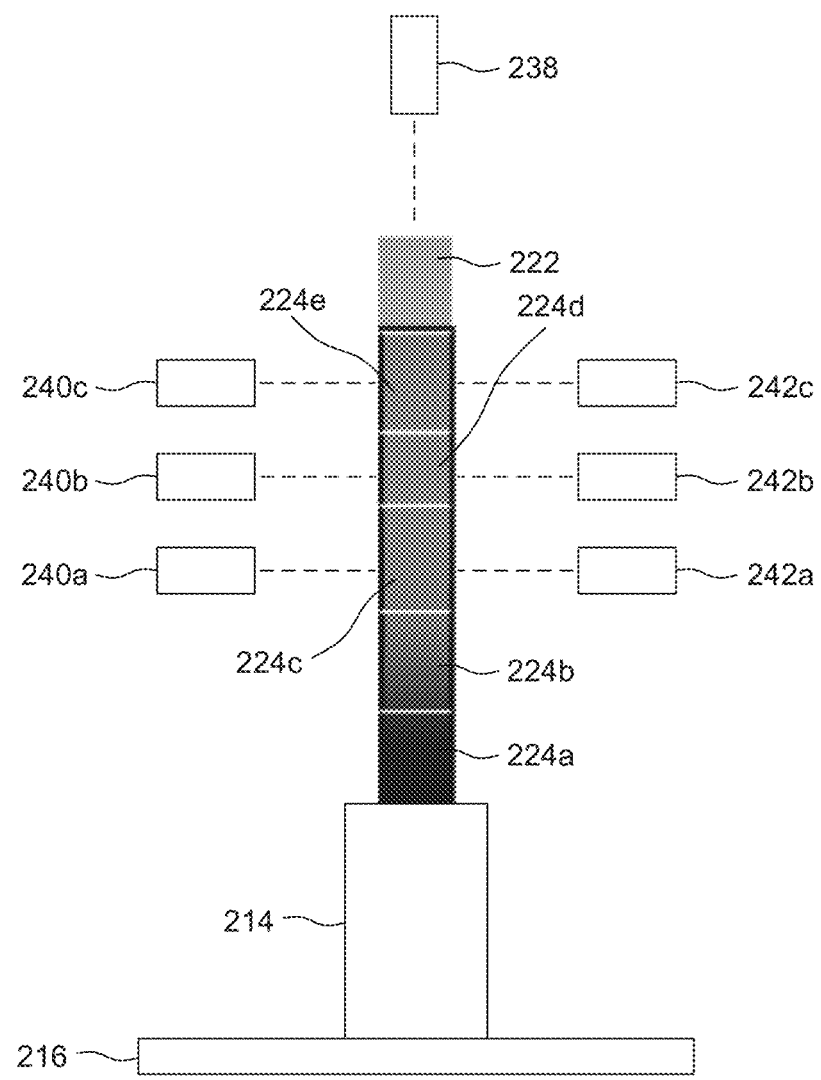
FIG. 4 is an end elevation view of the embodiment of FIG. 3, showing temperature sensors.

FIGS. 3 & 4 show a first exemplary embodiment of a WAAM system 200. In system 200, side wall cooling nozzles 234a-c, 236a-c are positioned along the left and right sides (respectively) of the finished layers 224a-e, between the top layer 222 and the substrate 214. The side wall cooling nozzles 234a-c, 236a-c are configured to direct a controlled spray of cryogenic fluid (such as nitrogen or argon) at the side walls of the finished layers 224a-e for the purpose of reducing temperature and, more importantly, reducing the temperature gradient between each of the layers 222, 224a-c.

Preferably, each side wall cooling nozzle 234a-c, 236a-c is independently controllable to provide multiple levels of cooling intensity. For example, each side wall cooling nozzle 234a-c, 236a-c could be adapted to provide four levels of cooling: Level 1: no cooling; Level 2: gaseous cooling only; Level 3: mixture of gas and cryogen; Level 4: cryogen only. Gaseous cooling is preferably provided by a separate gas source, such as a houseline gas.

In order to enable effective control of the side wall cooling nozzles 234a-c, 236a-c, the temperature of each layer 222, 224a-c is monitored. This is preferably accomplished using a sensor or thermocouple that measures the temperature of each layer, as variations in layer thickness, conductivity of materials, and ambient temperature make it impractical to develop a reasonably accurate predictive mathematical temperature model. Alternatively, it would be possible to measure temperature in the top layer 222 and a few of the uppermost finished layers, such as finished layers 124d, 124e—because these layers typically have the greatest temperature gradient.

Referring to FIG. 4, in this embodiment, side wall infrared sensors 240a-c, 242a-c are provided on the left and right sides of the upmost finished layers 224c-e, respectively. In addition, a top infrared sensor 238 is positioned above the top layer 222. Preferably, the sensors 240a-c, 242a-c, 238 trail the feed wire (not shown in this embodiment. See feed wire 120 of FIG. 2) and move with the torch assembly.

Figure 5:
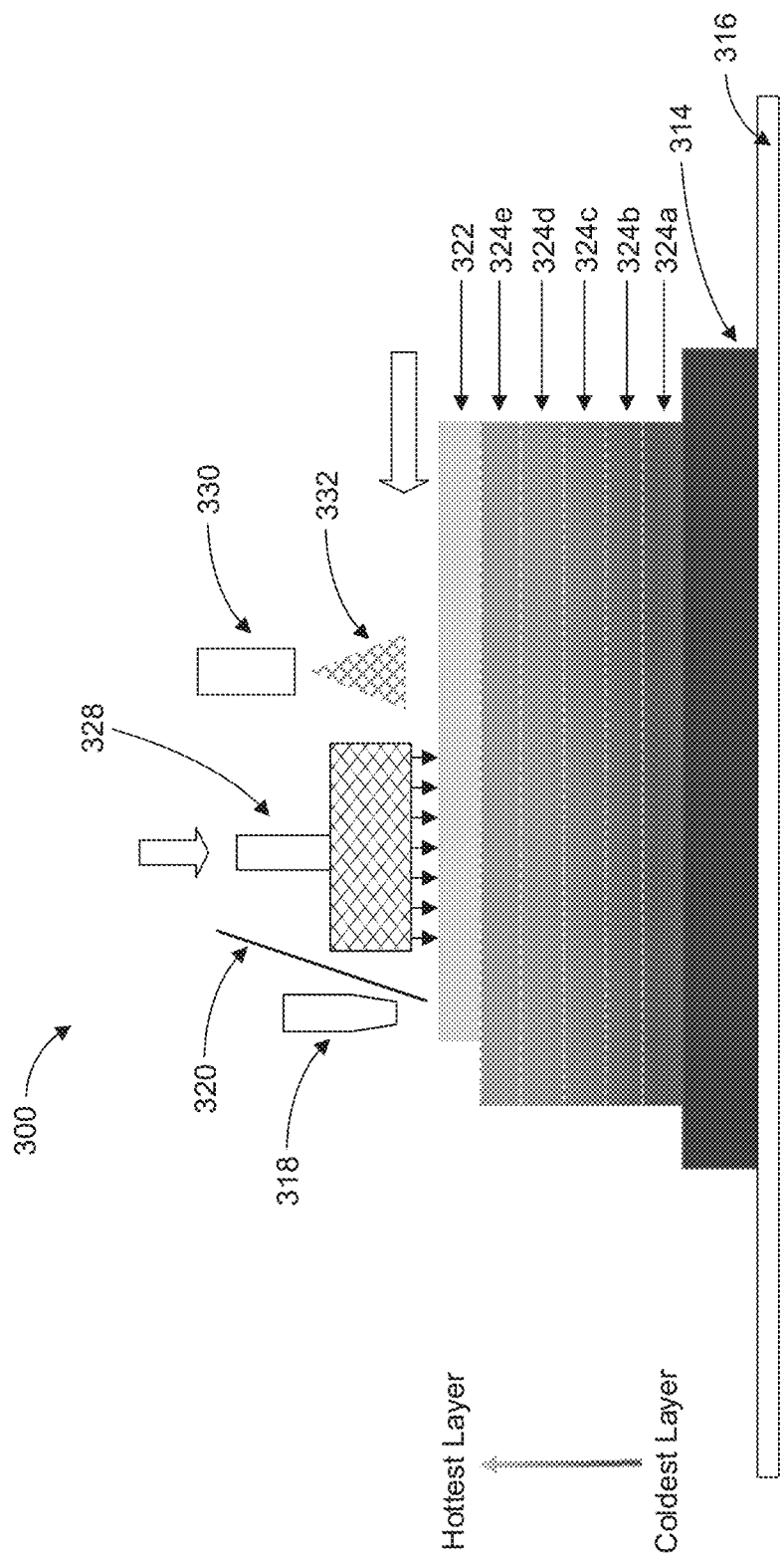
FIG. 5 is a schematic side elevation view of a second exemplary embodiment of the invention, which includes a top surface cooling nozzle.
Figure 6:
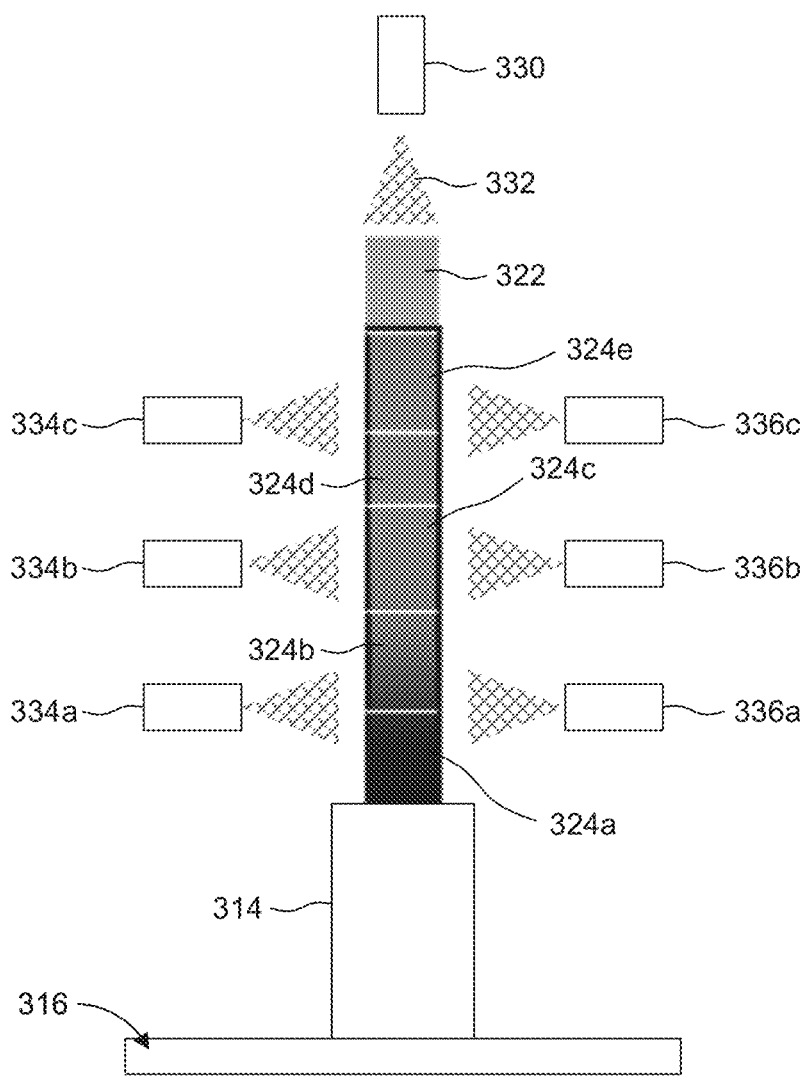
FIG. 6 is an end elevation view of the embodiment shown in FIG. 5, showing multiple side wall cooling nozzles directed to each side wall.

FIGS. 5 & 6 show another exemplary embodiment of a WAAM system 300. In this embodiment, a top nozzle 330 is provided, which directs a coolant onto the top surface of the top layer 322. The top nozzle 330 provides more control over the temperature and temperature gradient of the top layer 332.

Figure 7:
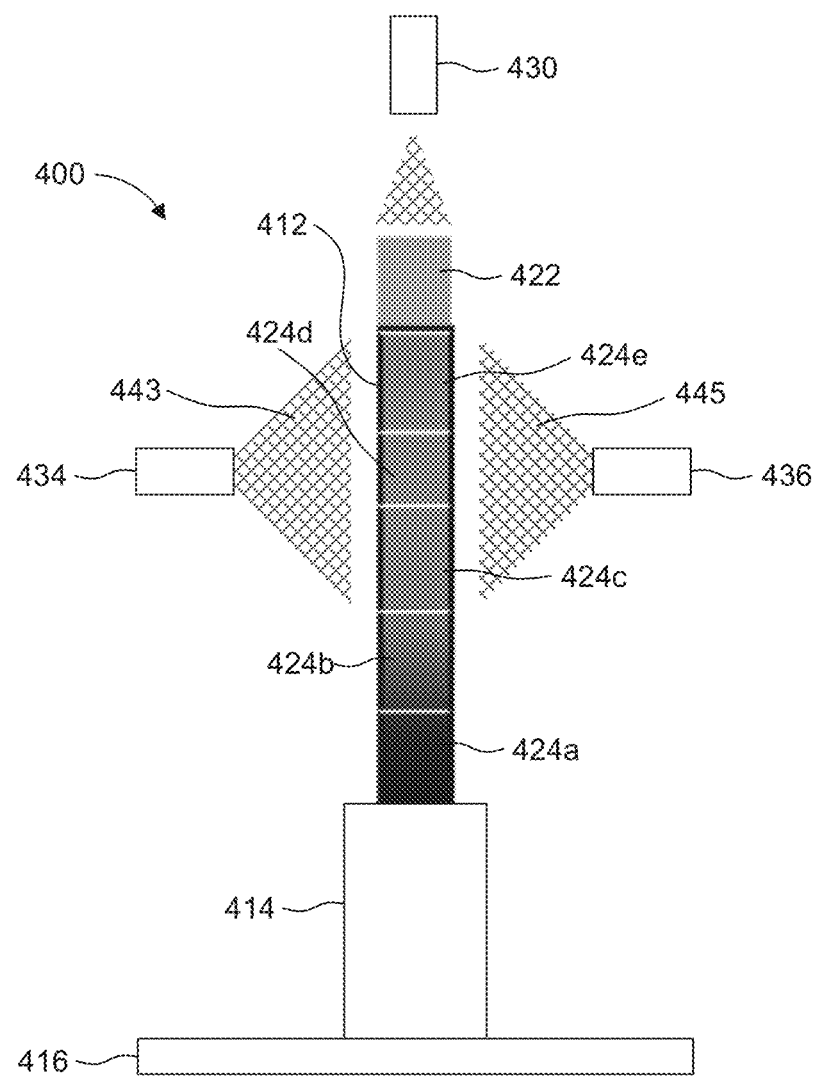
FIG. 7 is an end elevation view of a third exemplary embodiment of the invention showing a single side wall cooling nozzle directed to each side wall.

FIGS. 7 & 8 show another exemplary embodiment of a WAAM system 400. In this embodiment, a single side wall nozzle 434, 436 is provided on each side of the part 412. Each of the side wall nozzles 434, 436 has a wide spray profile 443, 445, respectively, which provides coolant coverage for multiple finished layers 424c-e. Similarly, a single infrared camera 440, 442 is provided on each side of the part 412. Each of the infrared cameras generates an image that is indicative of temperatures at a plurality of locations within the image. This enables measurement of temperature across multiple finished layers 424c-e by choosing temperature readings from locations that correspond to each layer. This configuration simplifies operation, but provides reduced control over the amount of coolant reaching each of the finished layers 424c-e. In an embodiment using infrared cameras 440, 442, the cameras could be stationery because they may have a field of view that captures the entire side wall of the part 412.

FIGS. 9-11 are flow diagrams of three different exemplary control logics that could be used with any of the WAAM systems disclosed herein. In the interest of simplifying the description, the control logic will be described in connection with the WAAM system 200 of FIGS. 3-4.

The exemplary control logic shown in FIG. 9 is intended to maintain each of the layers 222, 242a-d below a predetermined critical temperature ($T_{max}$), above which the grain growth rate in the part 212 is unacceptably high and the part 212 should not be exposed to ambient air (i.e., the part should remain in an inert atmosphere). It is common for nozzles to be set at Level 1 or 2 prior to the commencement of production. The control logic sequence starts at step 510, then it is determined whether the system is in production in step 512. If the system 200 is in production, flow continues to step 514, where each of the cooling nozzles 234a-c, 236a-c is set to production intensity, which will often be Level 3, but could also be Level 1 or 2 in some production environments. Then temperature is measured at each of the infrared sensors 240a-c, 242a-c in step 516. If any of the sensors 240a-c, 242a-c detects a temperature above $T_{max}$, the cooling level nozzle in the zone of that sensor is increased to the next level. If the production intensity is Level 3, then the increase would be to Level 4. If the production intensity is Level 2, then the increase would be to Level 3. If the measured temperature drops below $T_{max}$, the nozzle would be returned to the initial production level. For example, if sensor 242c detected a temperature above $T_{max}$, then sidewall nozzle 236c would be increased to Level 4 until the detected temperature dropped below $T_{max}$, then is returned to Level 3.

A second exemplary control logic is shown in FIG. 10. This control logic is intended to maintain a temperature gradient between any of the layers 222, 242a-d below a predetermined maximum ($TG_{max}$), above which harmful residual stress could be produced in the part 212. The control logic sequence starts at step 610, then it is determined whether the system is in production in step 612. If the system 200 is in production, flow continues to step 614, where each of the cooling nozzles 234a-c, 236a-c is set to production intensity (which will typically be Level 2 or 3). Then temperature gradient is measured between each of the infrared sensors 240a-c, 242a-c in step 616 (by calculating a difference between adjacent sensors). If a temperature gradient is calculated that is above $TG_{max}$, the cooling level of the nozzle for the zone where the higher temperature reading occurred is increased (e.g., from Level 2 to Level 3 or from Level 3 to Level 4). When the temperature gradient drops below $TG_{max}$, the nozzle would be returned to production intensity. For example, if the temperature gradient between sensors 242b and 242c was above $TG_{max}$ (with sensor 242c having the higher temperature), sidewall nozzle 236c would be increased from production intensity (Level 3 in this example) to Level 4 until the temperature gradient dropped below $TG_{max}$, then is returned to Level 3.

A third exemplary control logic is shown in FIG. 11. This control logic combines the exemplary control logics shown in FIGS. 9 and 10, in that it is intended to maintain the temperature of each layer below a predetermined maximum temperature $T_{max}$ and to maintain the temperature gradient between each layer below a predetermined maximum temperature gradient $TG_{max}$. The control logic sequence starts at step 710, then it is determined whether the system is in production in step 712. If the system 200 is in production, flow continues to step 714, where each of the cooling nozzles 234a-c, 236a-c is set to Level 3 (mixture of gas and cryogen). Then temperature is measured at each of the infrared sensors 240a-c, 242a-c in step 716. If any of the sensors 240a-c, 242a-c detects a temperature above $T_{max}$, the cooling level nozzle in the zone of that sensor is increased to Level 4 (step 718). Then temperature gradient is measured between each of the infrared sensors 240a-c, 242a-c in step 720 (by calculating a difference between adjacent sensors). If a temperature gradient is calculated that is above $TG_{max}$ (step 722), the cooling level nozzle for the zone where the higher temperature reading occurred is increased to Level 4 (step 724). Control logic flow is then returned to step 716.

Any suitable control system could be used to provide the operational functionality described above. An exemplary system 800 with a controller 850 is shown schematically in FIG. 16. The other parts of the system, including the torch 818, the wire feed 820, cooling nozzles 834, and temperature sensors 840 could be comprised of any combinations of elements disclosed in the embodiments of FIGS. 3 through 8. The controller 850 preferably has an electrical connection (signified by the lines shown in FIG. 16). Such connections could be wired or wireless, using any suitable communication protocol. The controller 850 is a preferably includes control logic similar to those shown in FIGS. 9 through 15, as well as control logic that controls movement and operation of the DED assembly 852. Alternatively, the system 800 could include separate controllers for controlling the cooling nozzles 834 and the DED assembly 852.

EXAMPLE

Temperature modeling was performed on a six-layer, thin-wall aluminum alloy part to compare the temperatures and temperature gradients that occur during formation of the part with and without cooling. Each of the layers from which the part is formed is 50 mm long, 2 mm high, and 1 mm wide. The layers are formed with a wire-arc torch moving at a speed of 150 mm/min with a heat input of 0.1 kJ per square meter. Cooling is provided by a top cooling nozzle and side cooling nozzles on the top two finished layers, all of which trail the torch assembly by 35 cm.

FIGS. 12 and 13 show temperature field of the left side wall (from the direction of FIG. 5) of parts formed without and with cooling, respectively, 10 seconds after the fifth layer has been completed. Line G in FIGS. 12 and 13 indicates the area in which the largest temperature gradients occur. The color-coded legend on the left of FIGS. 12 and 13 indicates relative temperature, with orange and red signifying a temperature above $T_{max}$. As can be seen in the figures, the temperature gradient in region G is much smaller in FIG. 13 than in FIG. 12.

FIGS. 14 and 15 show temperature fields of the top surface of the top layer of parts formed without and with cooling, respectively, 10 seconds after the fifth layer has been formed. Line G in FIGS. 14 and 15 indicates the area in which the largest temperature gradients occur. The color-coded legend on the left of FIGS. 14 and 15 indicates relative temperature. As can be seen in the figures, the temperature gradient in region G is much smaller in FIG. 15 than in FIG. 14.

As such, an invention has been disclosed in terms of preferred embodiments and alternate embodiments thereof. Of course, various changes, modifications, and alterations from the teachings of the present invention may be contemplated by those skilled in the art without departing from the intended spirit and scope thereof. It is intended that the present invention only be limited by the terms of the appended claims.

The invention claimed is:

1. A method comprising:
   a. forming a metal part comprising a plurality of layers using a direct energy deposition additive manufacturing process, the plurality of layers comprising a top layer and a plurality of finished layers that collectively form left and right sidewalls;
   b. providing a plurality of coolant nozzles in fluid flow communication with a cryogenic fluid, the plurality of coolant nozzles comprising a plurality of sidewall coolant nozzles that are capable of providing cooling to at least a portion of at least one of the left and right sidewalls;
   c. measuring a plurality of sidewall temperatures, each of the plurality of sidewall temperatures corresponding to a different one of the plurality of layers; and
   d. controlling a cooling intensity of each of the plurality of coolant nozzles in order to maintain a temperature gradient between each of the plurality of sidewall temperatures measured in step (c) below a first predetermined maximum temperature gradient and below a first predetermined maximum temperature, wherein the temperature gradient is the difference between the sidewall temperatures of two adjacent layers of the plurality of layers.

2. The method of claim 1, wherein step (a) further comprises forming the metal part comprising the plurality of layers using a wire-arc additive manufacturing process.

3. The method of claim 1, wherein step (a) further comprises forming the metal part comprising the plurality of layers using a blown powder additive manufacturing process.

4. The method of claim 1, wherein each of the plurality of layers has a height of at least 1 mm.

5. The method of claim 1, wherein the plurality of coolant nozzles comprises at least one top nozzle that is adapted to provide cooling to the top layer and a plurality of sidewall nozzles that are adapted to cool at least one of the plurality of finished layers.

6. The method of claim 5, wherein the cryogenic fluid in fluid flow communication with the plurality of sidewall nozzles has a different composition from the cryogenic fluid in fluid flow communication with the at least one top nozzle.

7. The method of claim 1, wherein the plurality of sidewall temperatures measured in step (c) are measured using a plurality of infrared sensors.

8. The method of any of claim 1, wherein the plurality of sidewall temperatures measured in step (c) are measured using at least one infrared camera.

9. The method of claim 8, wherein the plurality of sidewall temperatures are obtained by reading a plurality of temperatures at different layers from a temperature field captured by each of the at least one infrared camera.

10. The method claim 1, further comprising:
g. measuring a plurality of top layer temperatures; and
h. controlling the cooling intensity of each of the plurality of coolant nozzles in order to maintain a temperature gradient between each of the plurality of top layer temperatures measured in step (g) below a second predetermined maximum temperature gradient and a second predetermined maximum temperature.

11. A method comprising:
a. forming a metal part comprising a plurality of layers using a direct energy deposition additive manufacturing process, the plurality of layers comprising a top layer and a plurality of finished layers that collectively form left and right sidewalls;
b. providing at least one coolant nozzle in fluid flow communication with a cryogenic fluid, a first nozzle of the at least one coolant nozzle being positioned to provide cooling to one of the left and right sidewalls;
c. measuring a temperature difference between a first pair of adjacent layers of the plurality of layers; and
d. controlling a cooling intensity of the least one coolant nozzle in order to maintain the temperature difference between the first pair of adjacent layers below a first predetermined maximum.

12. The method of claim 11, further comprising:
e. measuring a temperature difference between a second pair of adjacent layers of the plurality of layers; and
f. controlling the cooling intensity of the least one coolant nozzle in order to maintain the temperature difference between the second pair of adjacent layers below a second predetermined maximum.

* * * * *